United States Patent [19]

Karmarkar

[11] Patent Number: 4,744,028
[45] Date of Patent: May 10, 1988

[54] METHODS AND APPARATUS FOR EFFICIENT RESOURCE ALLOCATION

[75] Inventor: Narendra K. Karmarkar, Somerset, N.J.

[73] Assignee: American Telephone and Telegraph Company, AT&T Bell Laboratories, Murray Hill, N.J.

[21] Appl. No.: 725,342

[22] Filed: Apr. 19, 1985

[51] Int. Cl.[4] ........................ G06F 15/20; H04Q 3/66; H04M 7/00
[52] U.S. Cl. ................................................. 364/402
[58] Field of Search ................ 364/402; 379/113, 221; 340/524

[56] References Cited

U.S. PATENT DOCUMENTS 4,364,115 12/1982 Asai ..................................... 364/765
4,479,176 10/1984 Grimshaw ........................... 369/168
4,481,600 11/1984 Asai ..................................... 364/765

OTHER PUBLICATIONS

Linear Programming and Extensions, G. B. Dantzig, 1963.
Hacijan, L. G., A Polynomiar Algorithm in Linear Programming, Soviet Math. Dokl, vol. 20, #1, 1979.
Bland, R. G. et al., The Elipsoid Method: A Survey, vol. 29, No. 6, Operations Research 1981.
A New Polynomial-Time Algorithm Ser Linear Programming, N. Karmarkar, ACM 1984.
Design and Optimization of Networks with Dynamic Routing, G. R. Ash et al., The Bell System Tech. Journal, vol. 60, No. 8, 10/1981, p. 1787.
G. R. Ash et al., Servicing and Real-Time Control of Networks with Dynamic Routing, The Bell System Tech. Journal, vol. 60, No. 8, 10/1981, p. 1821.
"The Ellipsoid Method and its Consequences in Combinatorial Optimization," Combinatorica 1(2), Grotschel et al., 1981, pp. 169-197.

Primary Examiner—Joseph Ruggiero
Assistant Examiner—Charles B. Meyer
Attorney, Agent, or Firm—Robert O. Nimtz; Henry T. Brendzel

[57] ABSTRACT

A method and apparatus for optimizing resource allocations is disclosed which proceeds in the interior of the solution space polytope instead of on the surface (as does the simplex method), and instead of exterior to the polytope (as does the ellipsoid method). Each successive approximation of the solution point, and the polytope, are normalized such that the solution point is at the center of the normalized polytope. The objective function is then projected into the normalized space and the next step is taken in the interior of the polytope, in the direction of steepest-descent of the objective function gradient and of such a magnitude as to remain within the interior of the polytope. The process is repeated until the optimum solution is closely approximated. The optimization method is sufficiently fast to be useful in real time control systems requiring more or less continual allocation optimization in a changing environment, and in allocation systems heretofore too large for practical implementation by linear programming methods.

36 Claims, 5 Drawing Sheets

SIMPLEX METHOD

SIMPLEX METHOD
(PRIOR ART)

ELLIPSOID METHOD
(PRIOR ART)

KARMARKAR METHOD

METHODS AND APPARATUS FOR EFFICIENT RESOURCE ALLOCATION

TECHNICAL FIELD

This invention relates to systems for resource allocation among a plurality of resource users and, more particularly, to apparatus and methods for the efficient optimization of technological and industrial resource allocation to minimize the costs or maximize the benefits of such allocation.

BACKGROUND OF THE INVENTION

The need for resource allocation decisions arises in a broad range of technological and industrial areas such as the assignment of transmission facilities in telephone transmission systems, the control of the product mix of a factory, the deployment of industrial equipment, inventory control, and others. Resource allocation in this context means, in general, the deployment of specific technological or industrial resources for the production of particular technological or industrial results.

Resource allocation decisions are typically subject to constraints on such allocations. Resources are always limited in overall availability and, furthermore, the usefulness of a particular resource in some particular application can also be limited. For example, the overall traffic offered to a telecommunications system is limited, and the traffic-carrying capacity of each individual link in the communication system is also limited. Each particular allocation of a resource can be associated with a "payoff," i.e., a cost of that allocation or an allocation benefit (e.g., profit). The problem, then, is to allocate all of the resources so as to satisfy all of the constraints and, simultaneously, to maximize the payoff, i.e., minimize the costs or maximize the benefits.

One method of representing allocation decision problems is called the linear programming model. Such a model consists of a number of linear expressions that represent the quantitative relationships between the various possible allocations, their constraints, and their costs or their benefits. The set of relationships is said to be linear if all of the relationships are sums of constant coefficients times unknown allocation values which are equal to, greater than or equal to, or less than or equal to, a constant. Many resource allocation problems, of course, cannot be represented by such linear relationships, but involve higher powers of the unknowns or other nonlinearities in the relationships and hence are not susceptible to linear programming approaches.

It should be noted that the resource allocation problems discussed above are real physical problems arising in real physical systems. While it is true that significant quantitative aspects of the physical problem can be represented by the linear programming model, the purpose of this model is to provide optimum values which are then used in the physical world to construct or operate a physical system. Typical prior art examples of the use of such mathematical models to characterize physical systems are the use of equations to construct radio antennas or to control rubber-molding operations.

At one time, many of the resource allocation problems described above were solved by human beings using their intuition and experience. More recently, quantitative tools such as statistics, modeling, graphs and linear programming have become available to assist human beings in these decision-making activities. For example, manufacturing plants use linear programming models to control production schedules and inventory levels that will satisfy sales demands and, at the same time, minimize production and inventory costs. Similarly, a communication system uses linear programming models to route telephone traffic over a network of transmission facilities so that the entire traffic demand is satisfied, no transmission links are overloaded, and transmission costs are minimized.

The best known prior art approach to solving allocation problems posed as linear programming models is known as the simplex method, invented by George B. Danzig in 1947, and described in *Linear Programming and Extensions*, by George B. Danzig, Princeton University Press, Princeton, New Jersey, 1963. In accordance with the simplex method, the first step is to select an initial feasible allocation as a starting point, possibly by using another linear programming model which is a variant of the original model. A feasible allocation, in this regard, is one which satisfies all of the constraints, but which is not known to be optimal. Successive new allocations are thereafter identified which improve the function to be optimized (called the objective function). The above process is repeated iteratively, selecting new tentative allocations which are always closer to the optimum allocation. This iterative process stops when the current tentative allocation can no longer be improved.

The simplex method may be better understood by considering the simplified graphical representation of a linear programming model given in FIG. 1. In FIG. 1, there is shown a three-dimensional representation of a convex polytope 10 having a plurality of facets, such as facet 11. Each of the facets of polytope 10 is a graphical representation of a portion of one of the constraint relationships in the formal linear programming model. That is, each linear constraint defines a plane in the space of the polytope 10, and a portion of that plane forms a facet of the polytope 10. Polytope 10 is convex in the sense that a line joining any two points on the surface of the polytope 10 lies within polytope 10.

It should be noted that polytope 10 is shown as a three-dimensional polygon for illustrative purposes only. In fact, the polytope representation of a linear programming model is contained in a hyperspace having a number of dimensions equal to the number of unknown allocation values (when viewed as in FIG. 1) or, more precisely, the number of inequality constraint relationships minus the number of equality constraint relationships. Indeed, the polytope divides the hyperspace into the feasible region of polytope 10 and the infeasible region outside of polytope 10.

It is well known that optimum resource allocations in linear programming models lie at vertices of polytope 10. In some models, an entire edge or an entire facet of polytope 10 will represent optimum allocations, and hence more than one vertex may be optimal. The strategy of the simplex method is to successively identify adjacent vertices of polytope 10, where each new vertex (each representing a new feasible set of allocations) is closer, as measured by the objective function, to the optimum point 21 than was the previous allocation. In FIG. 1, the simplex method might first identify vertex 12 and then move in a path 13 from vertex to vertex (14 through 20) until arriving at the optimum point 21. The simplex method is thus constrained to move on the surface of polytope 10 and, moreover, to move from one vortex 12 of polytope 10 to an adjacent vertex (e.g., 14). In large linear programming problems, involving thousands, hundreds of thousands, or even millions of variables, the number of vertices on the polytope increases correspondingly, sometimes exponentially. The length of path 13 increases, on the average, in direct proportion to the number of variables. Moreover, there are so-called "worst case" problems where the topology of the polytope is such that a substantial fraction of the vertices must be traversed to reach the optimum vertex.

As a result of these and other factors, the average computation time needed to solve a linear programming model by the simplex method grows at least proportionally to the square of the number of constraints in the model. For even moderately-sized allocation problems, this time is often so large that using the model is not practical, i.e., the constraints change before an optimum allocation can be computed, or the computation time necessary to optimize allocations using the model (presumably on a computer) is so large that it is simply not available for that purpose at a reasonable cost. Optimum allocations could not generally be made in "real time," i.e., sufficiently fast to provide more or less continuous control of an ongoing process, system or apparatus.

A second method for attacking linear programming models has been called the ellipsoid method, invented by N. Z. Shor of the Soviet Union in 1970, and described in an article by L. G. Khachiyan, "A Polynomial Algorithm in Linear Programming," *Doklady Akademiia Nauk* SSSR 244:S, pp. 1093-1096, 1979 (translated in 20 *Soviet Mathematics Doklady* 1, pp. 191-94, 1979). In the ellipsoid method, the polytope 30 of FIG. 2 is enclosed in an ellipsoid 31 having a center point 32. The center point 32 of ellipsoid 31 is checked to see if it is inside or outside of polytope 30. If point 32 is outside the polytope 30, as shown in FIG. 2, a plane 33 is passed through the center point 32 parallel to a facet of polytope 30 such that point 32 is on the wrong side (outside) of the constraint containing that facet. It is then determined which half of ellipsoid 31 contains polytope 30. In FIG. 2, it is the upper half of ellipsoid 30.

A second, smaller ellipsoid 34 is then constructed around the upper half of ellipsoid 31, having a center point 35. Again, center point 35 is checked to see if it is inside or outside of polytope 30. If it is outside (as in FIG. 2), the above process is repeated until the center point is within polytope 30. When the center point of the enclosing ellipsoid is within the polytope 30, the plane through the center point is drawn normal to the direction of the objective function to cut the polytope 30 into two pieces. It is then determined which piece of polytope 30 contains the optimum point 36. Another ellipsoid is then constructed around the half of polytope 30 containing the optimum point 36, another plane is passed through its center, a test performed to identify which half of the ellipsoid contains the optimum point 36, and so forth. This process is continued until the center point more or less coincides with the optimum point 36. The coordinates of the center point can then be "rounded" to the exact values of the optimum allocations represented by point 36 within the accuracy of the numbering system used to express the model in the first instance.

Although conceptually very simple, the ellipsoid method performs more slowly than the simplex method for most linear programming models for reasons discussed by R. G. Bland et al. in "The Ellipsoid Method: A Survey," *Operations Research*, Vol. 29, No. 6 (1981), pp. 1039-1091.

A new and more efficient method or procedure for attacking linear programming models is needed. For example, the optimum routing of long haul telephone traffic through the national telephone network involves a very large number of possible linkages, all with associated costs and constraints. Solutions to this particular problem must be available within a reasonable time, i.e., a time short enough so that practical use can be made of that solution by adjusting the traffic routing so as to take advantage of the optimum values. It is the solution of this type of problem to which the present invention is directed.

SUMMARY OF THE INVENTION

In accordance with the illustrative embodiment of the present invention, optimum resource allocation is accomplished much faster than was possible by the best prior art resource allocation procedures. More specifically, by using the principles of the present invention, some linear programming models can be solved in "real time," i.e., sufficiently fast to permit more or less continuous control of a system of apparatus. Other allocation problems can be solved sufficiently fast to make linear programming approaches economically attractive where the prior art linear programming approach was not economically feasible. Finally, some allocation problems which were so large that linear programming was not even considered as a possible approach can now be efficiently solved by the use of the linear programming approach in accordance with the present invention.

The procedure for achieving these markedly improved benefits, which will be rigorously defined hereinafter, can be understood by considering the polytope 50 of FIG. 3. The polytope 50, like polytopes 10 and 30 of FIGS. 1 and 2, has a plurality of facets, corresponding to the planes of the constraints, a plurality of edges corresponding to the intersections of the planes, and a plurality of vertices corresponding to the intersections of the edges. Each point on the surface of polytope 50 and each point in the interior of polytope 50 represents a feasible allocation of resources, i.e., an allocation that meets all of the constraints. The coordinates of each point are the magnitudes of the allocation values.

In accordance with the present invention, a point 51 in the interior of polytope 50 is selected as a starting allocation point. Successive steps 52, 55 and 56 are then taken in the interior of polytope 50 along a trajectory towards the optimum allocation point 53. Since the size of successive steps is not limited by the adjacent vertex spacing (as in the simplex method), much larger steps can be taken, fewer steps are needed, and the time required to identify the optimum allocation is shortened.

More specifically, an arbitrarily or systematically chosen allocation point 51 in the interior of the polytope 50 is used as the starting point. Using a linear change of allocation variables which preserves linearity and convexity, the variables in the linear programming model are transformed such that the starting point is substantially at the center of the transformed polytope and all of the facets are more or less equidistant from the center. This equidistancing procedure can be called normalization, centering, an equidistancing normalization, a normalizing transformation, or a centering transformation. The next allocation point is selected by moving in a direction along the negative of the gradient of the objective function (the direction of steepest descent) and by a distance constrained by the boundaries of the polytope (to avoid leaving the polytope interior). Finally, an inverse transformation is performed on the new allocation point to return that point to the original variables, i.e., to the space of the original polytope. Using the transformed new point as a new starting point, the entire process is repeated.

Since each step is radial within the polytope rather than circumferential on the polytope surface, many fewer steps are necessary to converge on the optimum point. Once a selected interior point is sufficiently close to the optimum point, i.e., within the limits of the precision with which the problem was originally proposed, the optimum point can be identified by "rounding" the values to the precision of the original problem, by identifying the constraints (facets) containing the optimum solution, or by any of the other stopping criteria available in the prior art.

The major advantage of the present invention is the speed with which the values of the resource allocation variables can be obtained. This speed not only makes for more efficient computation of optimum resource allocation than is currently provided by the simplex and ellipsoid methods, but also permits, for the first time, the practical possibility of allocating resources in "real time". The present invention also permits, for the first time, resource allocation in systems heretofore too large to be carried out in a reasonable time by the prior art methods.

The possibility of allocating resources in "real time," i.e., fast enough to be used dynamically to control an ongoing process, permits manufacturing or fabrication processes, navigation processes and telephone routing processes to be controlled by optimally allocating and reallocating resources continuously as the environment (constraints) change. In addition, very large systems for resource allocation which could not be controlled in any practical amount of time can now be controlled expeditiously using the teachings of the present invention.

DETAILED DESCRIPTION

Figure 1:
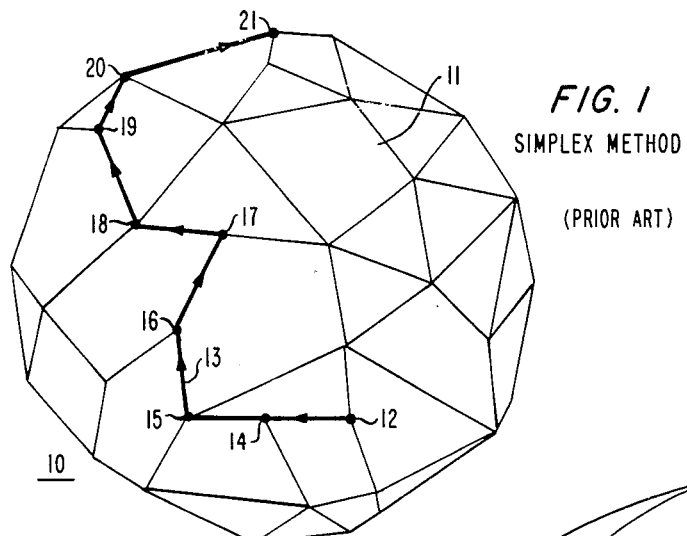
FIG. 1 is a graphical representation of the prior art simplex method for determining optimum resource allocations in linear programming models.
Figure 2:
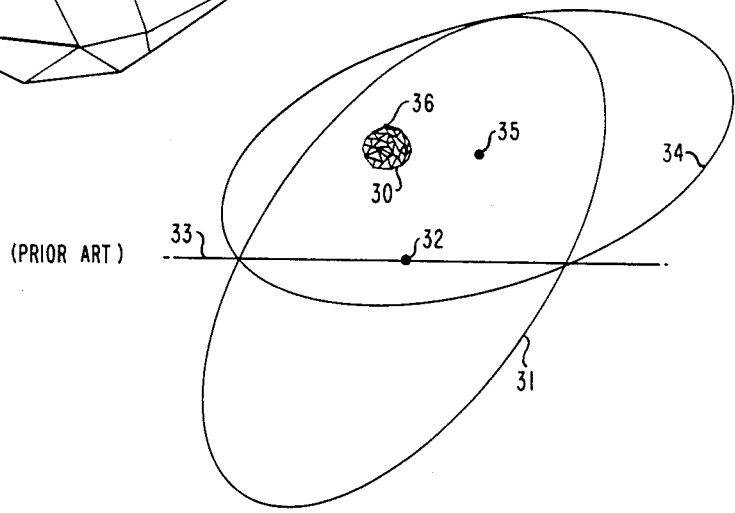
FIG. 2 is a graphical representation of the prior art ellipsoid method for determining optimum resource allocations in linear programming problems.
Figure 3:
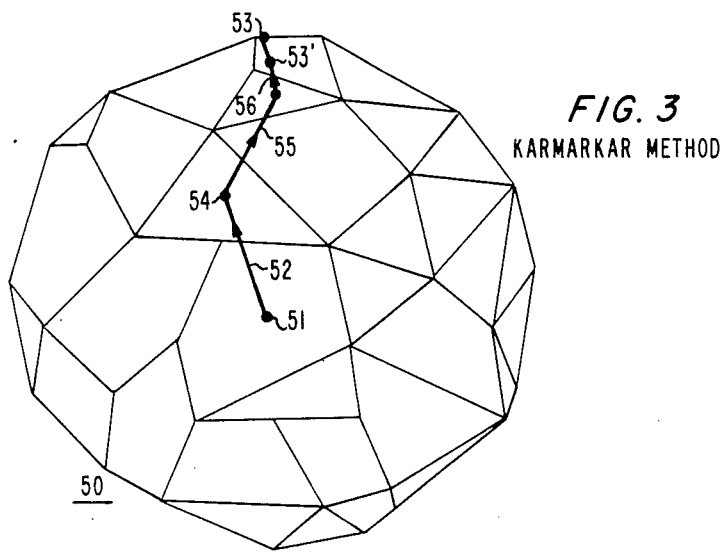
FIG. 3 is a graphical representation of the method of the present invention for determining optimum resource allocations in linear programming problems.

The newly constructed method for making optimum resource allocations with a linear programming model will first be discussed, and thereafter the use of this method in technological and industrial resource allocation systems, apparatus and procedures, will be taken up.

The formal statement of a linear programming model takes the form of an objective function which is to be maximized or minimized, and a plurality of constraint relationships which express the physical constraints on acceptable allocations. These constraints correspond to, and represent, as accurately as possible, the actual physical constraints present in the physical system. In standard vector notation, a typical linear programming model is expressed as follows:

Find a vector x of length n to $$
\begin{aligned}
\text{Minimize:} \quad & c^T x \\
\text{Subject To:} \quad & Ax = b \\
\text{and} \quad & L \leq x \leq U
\end{aligned}
\tag{1}
$$

where $c = (c_1, c_2, \ldots, c_n)$ is a vector of cost coefficients, the superscript T represents the matrix transposition operation, $x = (x_1, x_2, \ldots, x_n)$ is a vector of allocation values, n is the number of such allocation values, $A = (a_{11}, a_{12}, \ldots, a_{ij}, \ldots, a_{mn})$ is an m by n matrix of constraint coefficients, $b = (b_1, b_2, \ldots, b_m)$ is a vector of m constants and $L = (l_1, l_2, \ldots, l_n)$ and $U = (u_1, u_2, \ldots, u_n)$ are lower and upper bounds, respectively, on the values of x. Typically, the values of the components of x (the allocation values) are constrained to be non-negative values, but other limits are possible. All objective functions and all constraint relationships can be reduced to this form by simple algebraic manipulation. "Greater than or equal to" constraints can, for example, be changed to "equality" constraints by adding artificial "surplus" variables to the constraint matrix. Similarly, "less than or equal to" constraints can be changed to "equality" constraints by adding artificial "slack" variables. These techniques are well-known in the prior art.

In accordance with the present invention, the deficiencies of both the simplex and the ellipsoid methods are overcome by using an entirely different strategy for allocating resources with a linear programming model. The simplex method guesses which of the various components $x_i$ of x will be at bound ($x_i = 0$) in an optimal x and revises this guess, one component of x at a time, as the algorithm proceeds, until an optimum set of x allocation components is achieved. In accordance with the method of the present invention, components of x are selected which are strictly feasible (inside the polytope), i.e., such that $Ax = b$ and $L < x < U$. By "strictly feasible" is meant values which satisfy all of the constraints, but are not equal to the boundary values. A linear change of variables is then made to the components of x such that a unit change of the changed variable component corresponding to a component of x that is near bound will translate back into a smaller change in the original x component than will a changed component corresponding to an x component further away from bound. This process is called normalization, centering, an equidistancing normalization, a normalizing transformation or a centering transformation. The direction of steepest descent is then determined in the new variables and translated back to a step direction in the original variables. A step is taken in that direction and of a magnitude which insures keeping the new components of x also strictly feasible, i.e., $l_i < x_i^{new} < u_i$.

Figure 4:
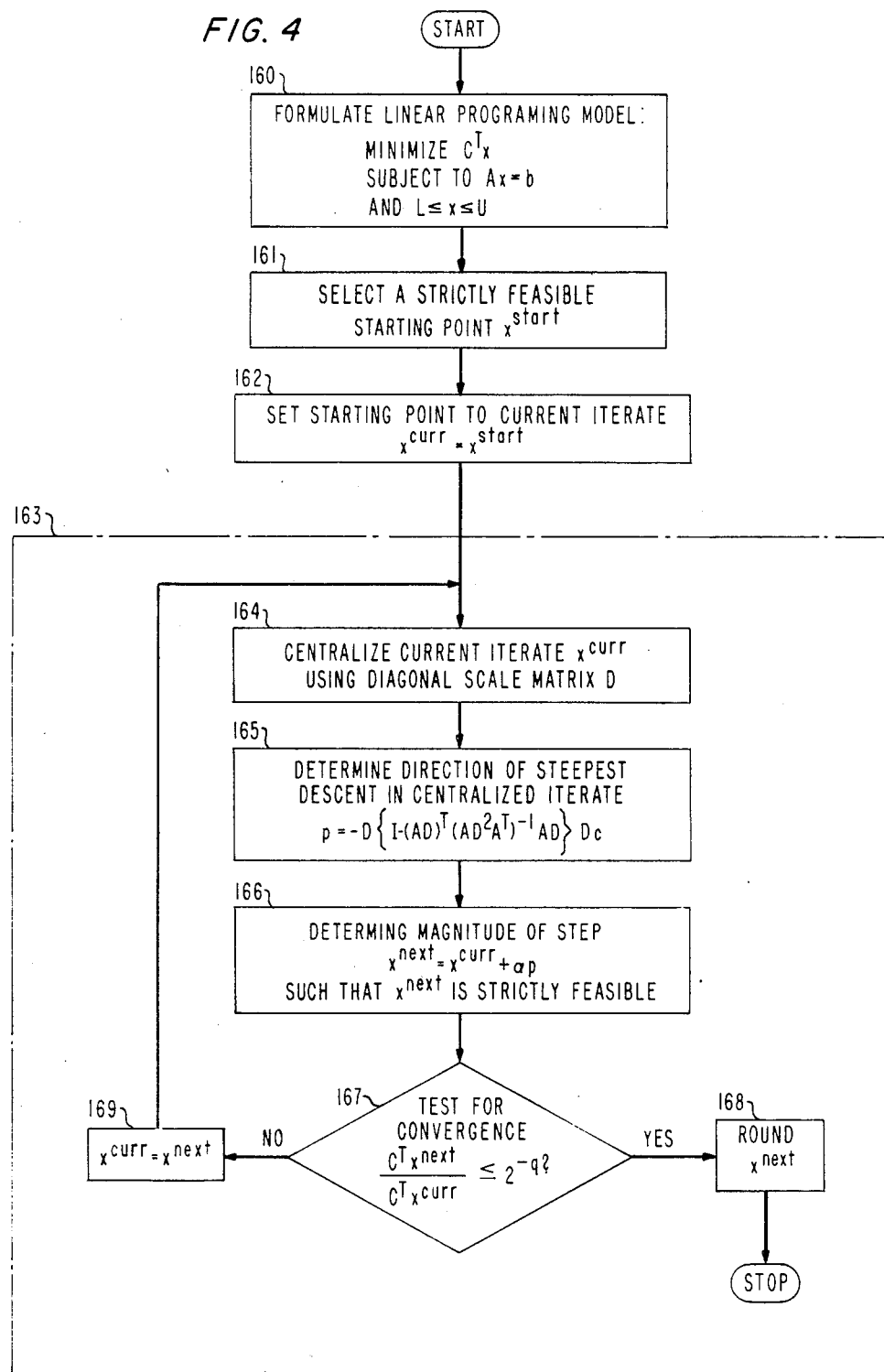
FIG. 4 is a general flow chart of the linear programming method in accordance with the present invention.

The above procedure is summarized in FIG. 4. As shown in FIG. 4, it is first necessary to formulate the linear programming model in box 160. A strictly feasible starting point $x^{start}$ is then selected in box 161 and the current iterate $x^{curr}$ is set to the starting point $x^{start}$ in box 162. Techniques for selecting the strictly feasible starting point will be discussed hereinafter. The balance of FIG. 4, contained in dashed box 163, is the iterative portion of the procedure in accordance with the present invention.

Iterative procedure 163 of FIG. 4 comprises the following steps. Given a strictly feasible iterate of the components of x:

(1) In box 164, choose a change of variables which will normalize the current iterate with respect to the bounds;
(2) In box 165, calculate the steepest descent direction in the new variables and translate that direction back into the original variables;
(3) In box 166, step in the translated direction by a magnitude which keeps the new iterate of the components of x also strictly feasible; and
(4) In decision box 167, terminate the procedure when no significant improvement in the objective function is observed. Otherwise, set the new iterate $x^{next}$ equal to the current iterate $x^{curr}$ in box 169 and return to box 164 to repeat steps (1) through (4).

One method of stopping the iterative procedure is by simultaneously solving both the "primal" linear programming (LP) model and the "dual" LP model. If the primal model is expressed as Minimize: $c^T x$
Subject To: $Ax = b$ and
$x \geq 0$ then the dual model can be expressed as:

Maximize: $u^T b$
Subject to: $A^T u \leq c$

These two models have the same optimum objective function, but the iterative procedure approaches these optimum values from opposite directions. The optimum values can then be approached as closely as desired simply by selecting a sufficiently small difference between the current primal objective function value and the current dual objective function value. Other stopping procedures are available in the prior art and may also be used.

It will be noted that the method of the present invention does not involve moving on the surface of the polytope, nor is it constrained in step-size by the spacing of adjacent vertices. As a result, the method of the present invention can inherently move more directly towards the optimum point, and in fewer steps. Not only does this invention provide a speed advantage over the simplex and ellipsoid methods for virtually all LP models, but the advantage increases with the size of the model (the number of variables). It therefore becomes possible to solve linear programming models fast enough to be useful in real time, i.e., before the problem changes so much that the solution is no longer valid and usable. In addition, it becomes possible to solve large linear programming models (involving a very large number of variables) which could not be solved at reasonable cost with the simplex or the ellipsoid methods.

One of the significant aspects of the above procedure is the choice of the change of variable in step (1) above. This change of variables can be represented by a diagonal scale matrix D. In order to carry out the normalizing function of placing the current iterate more or less equally distant from all of the bounds, the value of the ith diagonal entry of D must be small when $x_i$ is near either $L_i$ or $U_i$. An obvious choice for the ith diagonal entry of D is $$D_{ii} = \min\{1, x_i^{curr} - L_i, U_i - x_i^{curr}\} \qquad (2)$$

where $x^{curr}$ is the current iterate of x. If the bounds are very large values, or if x is unbounded in the positive or negative direction, a reasonable bound should nevertheless be placed on $D_{ii}$, e.g., $$D_{ii} = \min\{1, x_i^{curr} - L_i, U_i - x_i^{curr}\} \qquad (3)$$

It is possible to keep some components of D fixed for more than one iteration, particularly if the component has not changed much or if the corresponding x component is a long distance from bound.

The search direction for the next iterate is given by $$p = D\{I - (AD)^T(AD^2A^T)^{-1}AD\}Dc \qquad (4)$$

where I is the identity matrix (major diagonal all ones) and superscript T denotes the transpose of the matrix (exchange rows and columns). The most difficult operation from a computational viewpoint is inverting the matrix product and approximation techniques or incremental change techniques may be appropriate for this purpose.

The value of the new iterate can be expressed as $$x^{new} = x^{curr} + \alpha p \qquad (5)$$

where $\alpha$ is the magnitude of the step in the direction specified by p. In order to keep the new iterate $x^{next}$ strictly feasible, $\alpha$ must be less than the distance to the nearest bound. A simple scheme is to move a fraction $\beta$ of the way to the nearest bound, i.e., $$\alpha := \beta \min \{\min\{(L_i - x_i)/p_i | p_i < 0\}, \min\{(U_i - x_i)/p_i | p_i > 0\}\} \qquad (6)$$

The value of $\beta$ must be less than one.

It will be noted that the method described above requires a strictly feasible starting point, i.e., a point within the interior of the polytope. While such a point may be readily identified in some situations, in the general case it is not even known whether or not there is a feasible region. A preliminary step to using the procedure described above is to determine if there are any solutions at all to the linear programming model and, if so, what is the value of a strictly feasible starting point. In the prior art this is called the feasibility problem, the solution of which normally precedes the solution of the linear programming model to find optimum values of the resource assignments.

In further accord with the present invention, a variation of the procedure described above can be used to solve the feasibility problem for linear programming models. In the simplex method, this is done by adding artificial slack or surplus variables to the constraint relationships and using the simplex method itself to see if the sum of these artificial variables can be reduced to zero for some set of allocation values. If not, the problem is infeasible and hence unsolvable. If this sum can be reduced to zero, the allocation values necessary to accomplish that end can be used as a starting point. In effect, a new objective function is used with the constraint relationships, i.e., minimize the sum of the artificial variables.

A similar strategy is used to solve the feasibility problem in the present invention. Since a strictly feasible starting point is needed as a beginning point, the new objective function is designed to achieve that end. In particular, if the linear programming model is solved so as to, at each step, minimize the distance from bound of the infeasible allocation values, the allocation values which result from the solution of this feasibility problem may be strictly feasible and can be used as a starting point for the main procedure. Thus, the feasibility problem can be stated as $$\text{Minimize:} \quad \sum_{i=1}^{n} \max\{0, (L_i - x_i), (x_i - U_i)\} \quad (7)$$
$$\text{Subject To:} \quad Ax = b$$
$$\text{and} \quad L < x < U.$$

The starting point for this procedure can be any value of x which satisfies the constraints $Ax=b$. Another starting procedure is disclosed in applicant's article entitled "A New Polynomial-Time Algorithm for Linear Programming," *Proceedings of the ACM Symp. on Theory of Computing*, Number 0-8791-133-4/84/004/0502, Apr. 30, 1984, Page 302–311.

Many variations on the value of the diagonal scale matrix D are possible so long as the normalizing property is maintained. Similarly, many variations on the value of $\alpha$ are likewise possible so long as the next iterate is strictly feasible, i.e., contained in the interior of the polytope. One such alternative normalization approach is disclosed in the above-noted publication of the present applicant.

The procedure outlined in applicant's publication makes a change of variables (a projective transformation), computing the steepest-descent direction of a "potential function" (to be discussed below) with respect to these new variables, moving some distance in this direction, such that the new iterate is still strictly feasible, and translating the resulting point back to the original variables. The change in variables discussed in applicant's publication is chosen so that the current iterate x translates into the centroid of the unit simplex and thus, in a sense, is equidistant from all inequality constraints.

The problem is first restated as:

$$\text{Minimize:} \quad c^T x \quad (8)$$
$$\text{Subject To:} \quad Ax = b$$
$$\text{and} \quad x \geq 0.$$

Rather than attempting to minimize $c^T x$ directly, the published procedure takes steps that reduce a "potential function" defined as $$f(x) = \sum_{i=1}^{n} \log \frac{\hat{c}^T x}{x_i} \quad (9)$$

where $\hat{c}$ is a modified form of c chosen so that any optimal solution $x^{opt}$ of equation (8) also solves equation (8) with $\hat{c}$ replaced by $\hat{c}$ and has $\hat{c}x^{opt}=0$, and uses a "sliding objective" method to maintain lower and upper bounds on the value of the optimal objective function.

Figure 5:
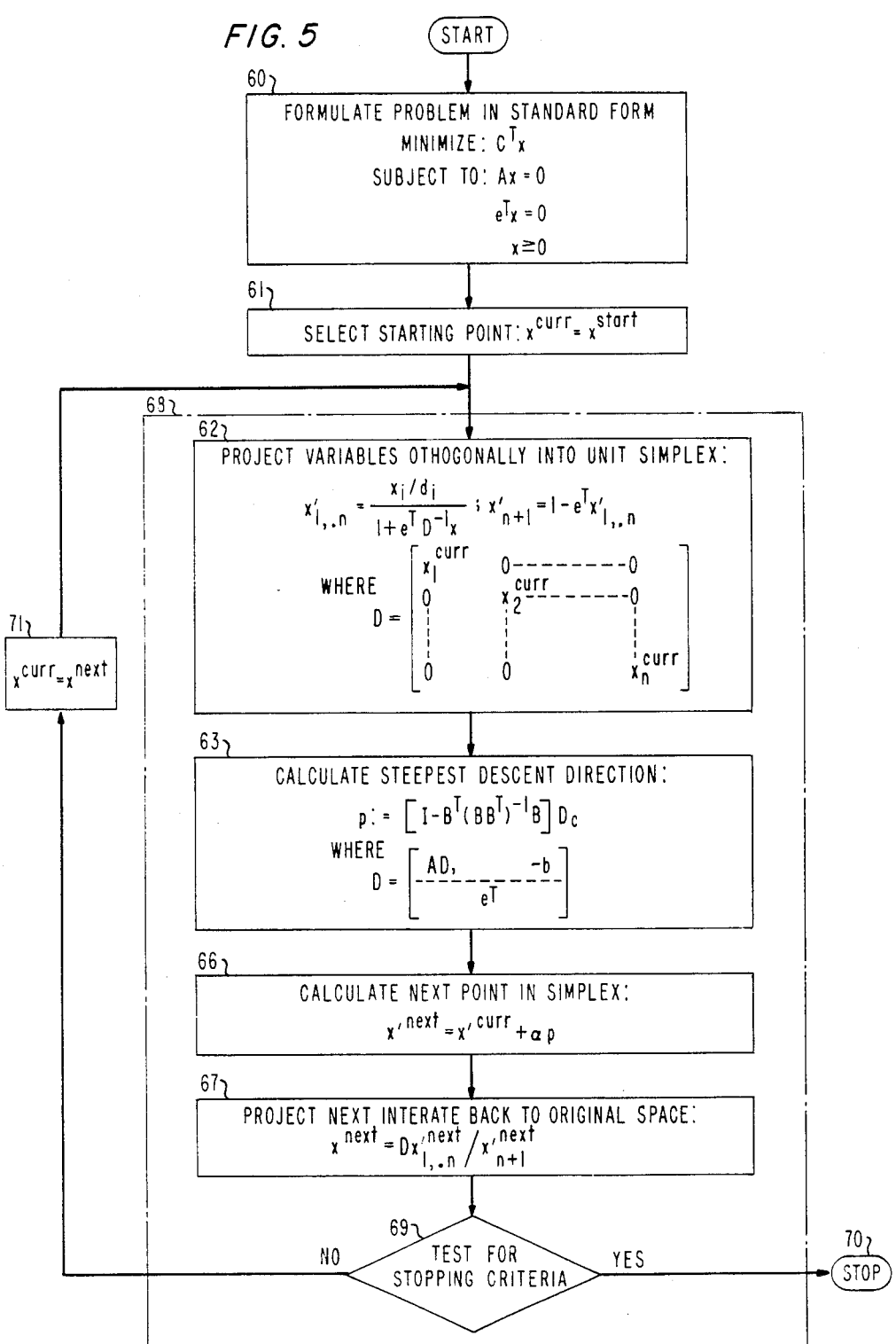
FIG. 5 is a more detailed flow chart of a variant of the method of the present invention using projective transformations for determining optimum resource allocations.

In the referenced publication, algebraic difficulties are reduced by putting the constraints into a special form:

$$\text{Minimize:} \quad c^T x \quad (10)$$
$$\text{Subject To:} \quad Ax = 0$$
$$\quad e^T x = 1$$
$$\text{and} \quad x \geq 0$$

where e is a vector of ones. This is accomplished by adding one or more component to x, adding a corresponding column of zeros to A, scaling A appropriately, and subtracting $be^T$ from the result. With the problem restated in the special form of equation (10), the procedure can be summarized as shown in FIG. 5. With the model stated in this form, an appropriate scaling matrix is the values of the current iterate itself, i.e., $D_{ii}=x_i$. Furthermore, the problem is transformed into a problem on the unit simplex in order to reduce computation complexities.

Referring more particularly to FIG. 5, in box 60, the linear programming problem is formulated in standard form. In box 61, a starting point $x^{start}$ in the interior of the polytope is selected, possibly in connection with a feasibility determination as suggested above. Using $x^{start}$ as the initial current iterate $x^{curr}$, the procedure for generating the next iterate $x^{next}$ is outlined in the balance 68 of the flowchart of FIG. 5. The steps are as follows:

1. Choose a diagonal scale matrix D whose ith diagonal entry is $(d_i=x_i^{curr})$. This selection determines the projective transformation into variable x' by the relationships $$x'_{1..n} = \frac{x^{curr}/d_i}{1 + e^T D^{-1} x^{curr}} \quad (11)$$

and $$x'_{n+1} = 1 - e^T x'_{1..n}$$

where $x'_{1..n}$ denotes the first n components of the (n+1) vector x'. This projective transformation can be thought of as an orthogonal transformation into the unit simplex, thereby achieving the normalizing or centering property. Box 62 summarizes this normalizing transformation of the variables into the null space of an affine unit simplex.

2. Compute the constrained steepest-descent direction p of the transformed objective function from the current iterate, now projected to the centroid of the unit simplex. This direction is given by $$p := -[I - B^T(BB^T)^{-1}B]Dc \quad (12)$$

where now $$B = \begin{bmatrix} AD, -b \\ e^T \end{bmatrix}. \quad (13)$$

This computation is shown in FIG. 5 in box 63.

3. Choose a value of $\alpha(\alpha=0)$ such that $(x'^{next}:=x'+\alpha p)$ is strictly feasible, i.e., $(x'^{next}>0)$, and such that the potential function $g(x')$ is reduced (preferable approximately minimized). The potential function here is $g(x')=f(T(x))$, where $$T(x)=Dx'_{1,..n}/x'_{n+1}. \quad (14)$$

This step is show in box 66 of FIG. 5.

4. Compute $\{x^{next}=T(x'^{next})\}$ where T is given by equation (14). This is shown in box 67 in FIG. 5.

Following the completion of the iterative procedure of dashed box 68 of FIG. 5, any known stopping criteria, including those discussed above, is applied in decision box 69. If the stopping criteria are satisfied in box 69, the procedure is complete and stops in terminal box 70. If the stopping criteria are not satisfied in box 69, the computed next iterate $x^{next}$ is substituted for the current iterate $x^{curr}$ in box 71, and box 62 is reentered for the next iteration.

Figure 6:
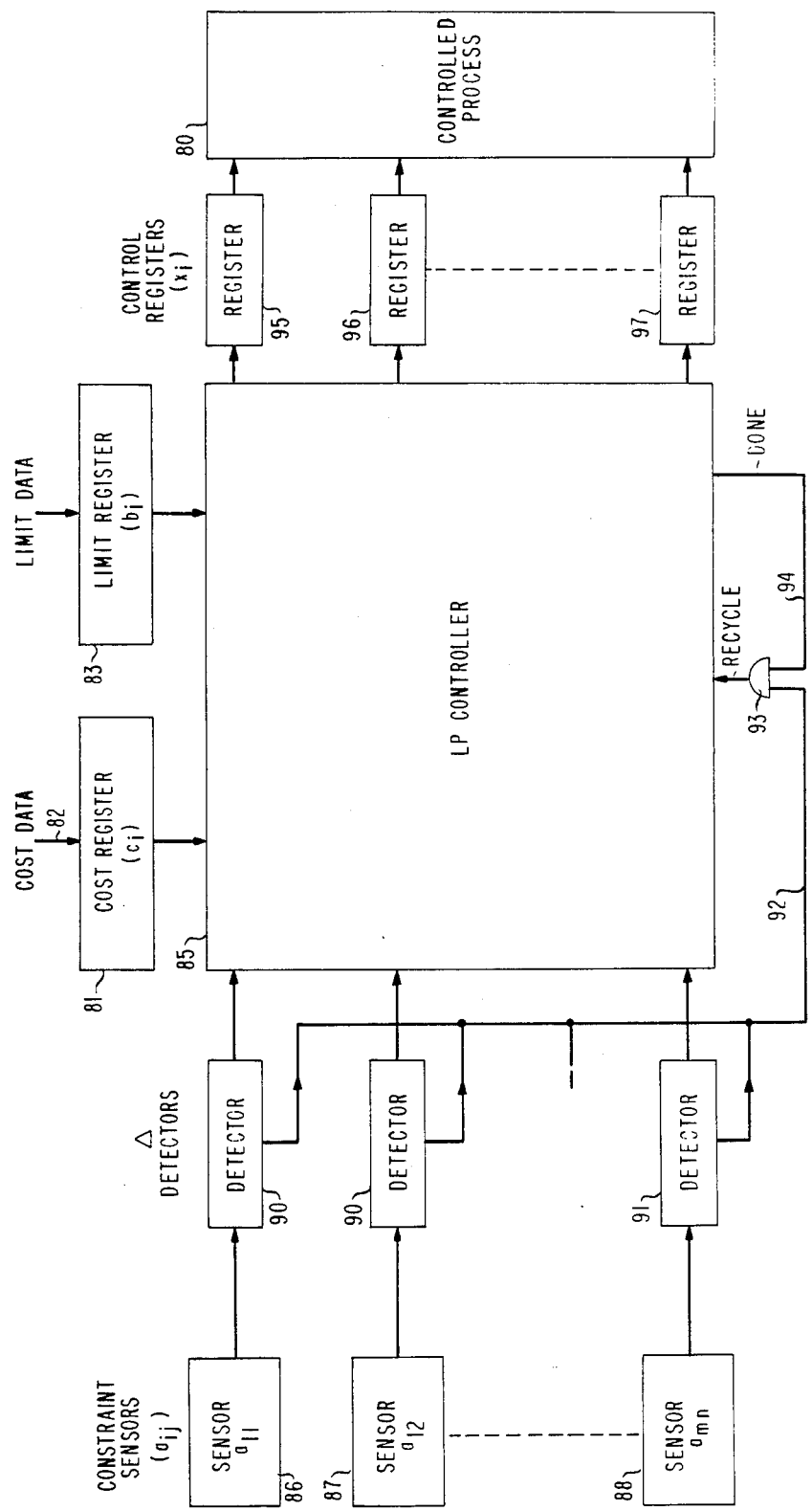
FIG. 6 is a block diagram of a resource allocation system using the method of FIG. 4 or FIG. 5 to control resource allocations.

In FIG. 6 there is shown a process control system which controls a process 80. Process 80 may be a telephone communications system, a manufacturing process, a navigation process, or any other industrial or technological process which is to be optimized. A cost register 81 receives cost data on leads 82 representing the per unit costs of the various possible allocations of resources in controlled process 80. Cost data may be entered into register 81 from a computer terminal or from separate processes which dynamically determine these costs. While this cost data normally changes relatively slowly, there is nevertheless the ability to update this data via input leads 82 whenever necessary. If there are non-zero limits (L and U in equation (1)) on the solution values, these limits, like the cost data, must be provided to LP Controller 85 by way of a data input register like register 81.

Similarly, a limit register 83 is provided to store a representation of the total physical limits on each specific resource allocation. These limits are likewise relatively static and can be entered via leads 84 into register 83 from a computer terminal or from a separate limit-determining process. The outputs of registers 81 and 83 are applied to a linear programming (LP) controller 85 which carries out the process summarized in the flowchart of FIG. 4 or of FIG. 5. LP controller 85 is, in the preferred embodiment, a programmed digital computer having stored therein the program which implements the flowchart of FIG. 4 or of FIG. 5. Controller 85 may also comprise a complex of hardwired circuits designed to carry out the procedures of FIGS. 4 or 5, a plurality of parallel processors to take advantage of the possibilities for parallel execution of the procedure, or a plurality of programmed linear arrays programmed for this purpose.

A plurality of constraint sensors 86, 87, . . . , 88 are provided to dynamically sense the constraint coefficients for the constraint relationships. Constraint sensors 86-88 are continually responsive to change in the environment of controlled process 80, which changes affect the constraint relationships and hence, must be tracked in order to control process 80. Each of constraint sensors 86-88 has a corresponding change (delta) detector 89, 90, . . . , 91 which senses changes in the output of each of the respective sensors 86-88. A change-indicating signal from each of detectors 89-91 is applied to change bus 92 and thence to AND gate 93. Also applied to AND gate 93 is a signal from LP controller 85 on lead 94 indicating the termination of the execution of the procedure. The outputs from sensors 86-88 are applied through detectors 89-91, respectively, to controller 85.

In operation, the outputs of sensors 86-88 are used by controller 85 as the coefficients of the constraint matrix A of equation (1). The cost data in register 81 is used as the cost vector (c) in equation (1) and the limit data in register 83 is used as the limit vector (b) of equations (1). Given these inputs, LP controller 85 is able to carry out the procedure of FIG. 4 or FIG. 5 and provide digital solution values (x's) to control registers 95, 96, . . . , 97. The values in registers 95-97 are then used to control process 80.

Since LP controller 85 of FIG. 6 utilizes the extremely rapid procedures of FIG. 4 or FIG. 5, control values are available for registers 95-97 in a very short time. Moreover, as the constraints change, these changes are sensed by sensors 86-88, detected by detectors 89-91, and used to partially enable AND gate 93. When the procedure of FIG. 4 or FIG. 5 is complete, LP controller 85 generates control signals and transfers them to registers 95-97 and, simultaneously, generates an enabling signal on lead 94 to AND gate 93, completing the enablement of AND gate 93. The entire process is then repeated.

Depending on the complexity of the problem (the number of constraints sensed by sensors 86-88) and the stability of process 80, it is possible to more or less continually control process 80 by this method. Indeed, if the rate of change of the environmental factors sensed by sensors 86-88 is equal to or less than the rate of operation of LP controller 85, the process 80 will be controlled continuously. Higher rates of changes in the environment will introduce granularity into the control process, but will still permit near optimum operation, on the average, of the process 80. Indeed, given some history of the environmental changes, some predictive mechanism can be built into detectors 89-91 to predict the direction and magnitude of future changes in the outputs of sensors 86-88.

A typical type of problem in the telecommunications field to which the present invention can be applied is described in two articles in *The Bell System Technical Journal*, Vol. 60, No. 8, October 1981. A first article entitled "Design and Optimization of Networks with Dynamic Routing" by G. R. Ash et al. (p. 1787) describes the general telephone traffic routing problem while the second article, entitled "Servicing and Real-Time Control of Networks with Dynamic Routing," also by G. R. Ash et al. (p. 1821) describes an auxiliary problem of minimizing idle capacity due to erroneous predictions of traffic loads. Both of these articles are herein incorporated by reference.

Figure 7:
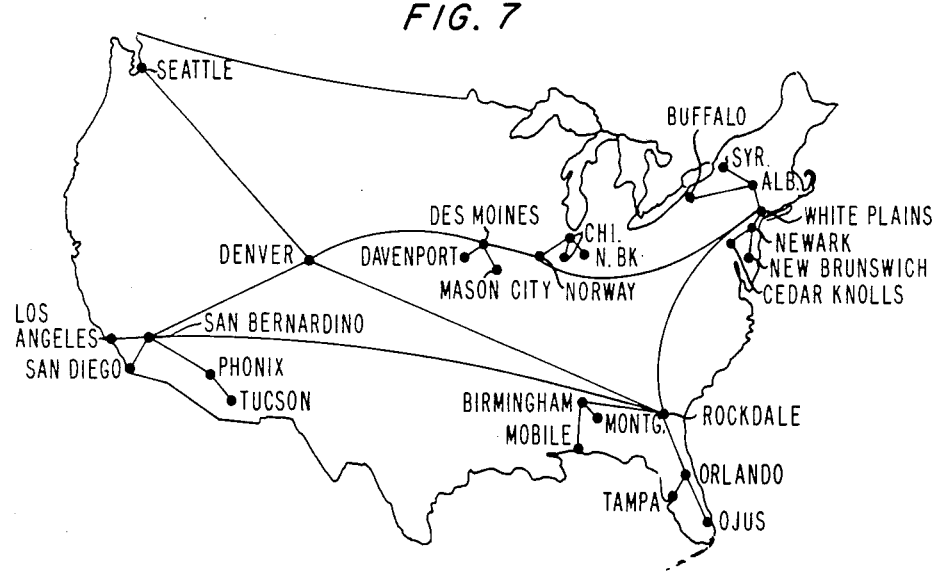
FIG. 7 is a graphical representation of a simplified telecommunications routing allocation problem in which the present invention might find use.

As seen in simplified form in FIG. 7, the national telephone network consists of large numbers of transmission facilities interconnecting a large number of telephone switching points. Telephone calls originating in one part of the network must be routed through the transmission facilities to specific telephone stations in another part of the network. Each link in the transmission facilities has a cost associated with it, as well as a maximum capacity constraint. The volume of traffic arising at each switching node is yet another variable. The telephone network is required to route all of the calls to the proper destination by the least expensive routes while, at the same time, not violating the capacity constraints. In the telephone network control system, the objective function is the summation of the costs for routing traffic over all of the various transmission links, i.e., c is the cost coefficient and x is the link load. The constraint coefficients ($a_{ij}$) represent the capacity of the transmission lines (which cannot be exceeded) and the traffic loads (which must be served). As in the general system of FIG. 6, only positive values of link loads are permissible ($x_i \geq 0$).

More specifically, a telephone routing system can be represented as a linear program model as shown in the Ash reference:

Minimize: $\sum_{i=1}^{L} M_i a_i$ (15)

Subject To: $\sum_{k=1}^{K} \sum_{j=1}^{J_k^h} P_{jk}^{ih} r_{jk}^h \leq a_i,$ $i = 1, 2, \ldots, L; h = 1, 2, \ldots, H$ $\sum_{j=1}^{J_k^h} \frac{r_{jk}^h}{1 - g_{jk}^h} = R_k^h,$ $h = 1, 2, \ldots, H; k = 1, 2, \ldots, K$ $r_{jk}^h \geq 0, \; a_i \geq 0$ where
L = the total number of links in the network,
K = the number of demand pairs (offered load),
H = the number of design hours,
$J_k^h$ = the number of routes for demand pair k in hour h,
$P_{jk}^{ih}$ = the proportion of carried load on route j for point-to-point demand pair k on link i in hour h,
$M_i$ = the incremental link cost metric in terms of dollar cost per erland of carried traffic for link i,
$R_k^h$ = the offered load to demand pair k in hour h,
$r_{jk}^h$ = the carried load on route j of demand pair k in hour h,
$A_i^h$ = the offered load to link i in hour h,
$a_i$ = the maximum carried load on link i over all hours,
$g_{jk}^h$ = the route blocking on route j of demand pair k in hour h, and
$b_i^h$ = the blocking on link i in hour h.

Figure 8:
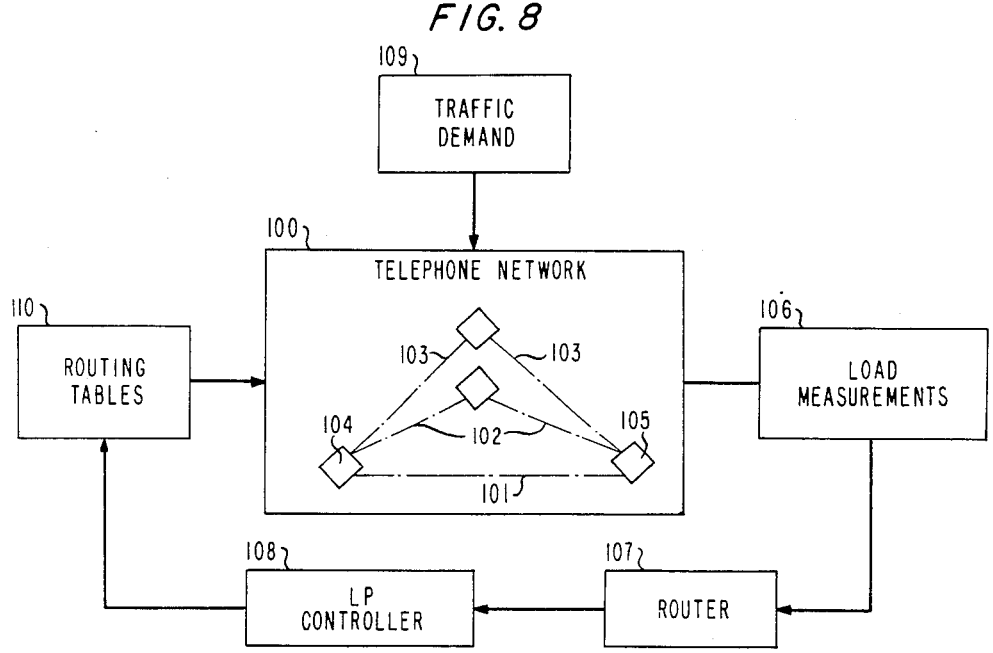
FIG. 8 is a general block diagram of a telephone routing apparatus constructed in accordance with the present invention and using the method of FIG. 4 or FIG. 5.

A system for solving this type of LP model is shown in FIG. 8.

FIG. 8 shows an iterative loop for route formulation for telephone network 100. The apparatus of FIG. 7 finds the shortest (most economical) paths, e.g., 101, 102, 103, between points, e.g., 104, 105, in the network 100. Acceptable blocking levels are assumed (or actual blocking is measured in box 106) and router 107 forms paths 101, 102, 103 into candidate routes (sequences of paths). Router 107 also determines the proportion of traffic flow offered to each path in the route for each unit of offered load, where this traffic load is continually provided by box 109. The linear program controler 108 then assigns traffic flows to the candidate routes to minimize overall network routing costs. The output from linear programming controller 108 is the optimum routing plan which can then be used by routing tables 110 to control the flow of traffic on each link.

The telephone routing apparatus of FIG. 8 can be used to control the telephone network continually or at regular intervals. Thus, with the much faster procedures of FIGS. 4 and 5, it is possible to use the apparatus of FIG. 8 to dynamically control the telephone network in the presence of changing demand and changing link availability.

It can be seen that the solution to the telephone routine problem provides the optimal traffic load to be placed on each transmission link, and hence the optimum routing for all telephone calls. Moreover, since the national telephone network includes a large number of such links, the time required to solve the problem is of considerable importance to the actual usefulness of the solution. Traffic loading changes, linkage outages and link cost variations all affect the optimal allocation. Routing control must therefore be provided before the problem itself changes significantly. While heuristic methods are of assistance in this regard, a much faster linear programming method is also of extreme usefulness, particularly in handling unexpected (unpredictable) loads.

Other problems which would benefit from the new procedures herein described include industrial process control, deployment of personnel to provide customer services, blending of ingredients to form commercial products, oil refinery product mix, assignments of computer resources to a plurality of users, and many others. In each case, the cost (or benefit) coefficients must be measured or otherwise determined, the constraint limits must be established and the contributions of all of the decision variables to these constraints also measured or determined. The result of executing the procedures is, in each case, the specification of a set of control parameters which, when applied to the real world situation, will produce an optimum process or apparatus.

It should be noted that the matrices involved in most practical linear programming problems are sparse matrices and that sparse matrix techniques can also be used in evaluating the search direction p in FIGS. 4 and 5.

While the present inventor has constructed a new method for solving linear programming problems, it is to be understood that the claims of this invention relate only to the application of this novel method to arrangements that determine the optimum allocation of resources in real world technological and industrial systems that lend themselves to a linear representation of the variables and constraints characterizing the system, i.e., physical arrangements that determine how resources are actually applied to optimize the performance of processes, machines, manufactures or compositions of matter. All other uses of the new method, such as computation research, algorithm research, or linear algebra research activities, form no part of the present invention. Similarly, use of the new method in non-technological or non-industrial systems likewise form no part of the present invention.

What is claimed is:

1. A method for allocating the available telecommunication transmission facilities among the subscribers demanding service at a particular time so as to reduce the total cost of operating said transmission facilities, where the available transmission facilities, the subscribers, and the total cost are related in a linear manner, said method comprising the steps of:

tentatively and iteratively reassigning said available telecommunications transmission facilities to said subscribers so as to reduce said total costs at each said reassignment, each said reassignment being determined by normalizing the previous assignment with respect to constraints on said allocations, terminating said iterative reassigning steps when said costs are below a preselected threshold, and allocating said transmission facilities in accordance with the reduced cost assignment.

2. A telecommunications transmission system comprising:
- a plurality of links interconnecting a plurality of telecommunication switching nodes, and
- means for assigning traffic arising at each of said nodes to said links so as to reduce the cost of carrying said traffic, said assigning means including
- means for iteratively selecting estimates of said reduced cost assignments such that each said iterative selection represents assignment values entirely in the interior of the multidimensional convex solution space representing the physical constrains on said assignments.

3. A method of allocating available user facilities among a plurality of users so as to reduce the cost of providing said facilities, said method comprising the steps of
- tentatively and iteratively reassigning said facilities among said users so as to reduce said costs at each said reassignment,
- each said iterative reassignment being determined by centralizing the previous assignment with respect to constraints on said allocations,
- terminating said iterative reassignment step when said costs are at a below a preselected limit, and
- allocating said available user facilities among said users in accordance with the final iterative reassignment.

4. The method according to claim 3 wherein said facilities comprise telecommunication transmission facilities and said users comprise telephone subscribers.

5. The method according to claim 3 wherein said facilities comprise information handling facilities.

6. The method according to claim 3 wherein said facilities comprise data processing facilities.

7. The method according to claim 3 wherein said facilities comprise manufacturing facilities.

8. An optimized resource allocation system comprising:
- a first plurality of physical resources available for use,
- a second plurality of resource users using said physical resources, and
- means for assigning said resource users to said physical resources so as to reduce the cost of providing said resources, said assigning means including
- means for iteratively and tentatively selecting feasible ones of said assignments such that, at each iteration, each of said feasible assignments is centered within the interior of a normalized multidimensional convex feasible solution space, and
- means for allocating said physical resources in accordance with the final one of said tentative assignments.

9. The allocation system according to claim 8 wherein said physical resources comprise telecommunications facilities and said users comprise telephone subscribers.

10. The allocation system according to claim 8 wherein said physical resources comprise information handling facilities.

11. The allocation system according to claim 8 wherein said physical resources comprise data processing facilities.

12. The allocation system according to claim 8 wherein said physical facilities comprise manufacturing facilities.

13. A system for optimizing the performance of a controlled process in accordance with an optimizing criterion, said system comprising:
- process control devices for controlling said process in response to control signal sets,
- a plurality of sensors for sensing variable conditions affecting the operation of said process,
- a plurality of data input devices for prescribing conditions affecting the operation of said process, and
- a linear programming controller responsive to said sensors and said input devices for providing optimum control signal sets to said process control devices,
- said controller including means for iteratively identifying successive tentative strictly feasible control signal sets and selecting each next tentative control signal set in the direction of the steepest gradient of a normalized version of said optimizing criteria.

14. A controller for optimizing the operation of a controlled system comprising:
- means for determining the physical constraints and constraint limits on the operation of said system,
- means for prescribing performance measurement criteria for the operation of said system,
- means for successively identifying tentative sets of operational control values strictly satisfying said constraints and said constraint limits,
- means for normalizing said tentative sets of control values so as to equidistance said control values from said constraint limits, and
- means for selecting each next successive set of normalized control values in accordance with said prescribed performance measurement criteria.

15. A method for allocating physical resources using a linear programming model including the steps of:
- prescribing a linear programming model with an objective function and a plurality of constraints which adequately describes feasible allocations of said physical resources,
- identifying a tentative physical resource allocation which is strictly feasible,
- iteratively improving said tentative resource allocation by normalizing said tentative resource allocation with respect to said constraints and altering said tentative resource allocations in the direction specified by said objective function, and
- allocating said resources in accordance with the most improved tentative resource allocation.

16. The improvement in linear programming methods for optimally allocating physical resources among a plurality of users which includes the steps of:
- iterating on only strictly feasible allocations, and
- normalizing each strictly feasible allocation with respect to the constraints on said allocations.

17. A system for allocating technological resources among a plurality of user entities, each said allocation having constraints imposed thereon and quantifiable costs or quantifiable benefits associated therewith, said system including resource allocation elements disposed by a resource allocating mechanism including:
- means for representing said constraints as a multidimensional convex polytope having facets representing said constraints and having a surface representing preferred resource allocations,
- means for tentatively selecting an allocation of said resources corresponding to a point in the interior of said polytope as a beginning point, means for stepping from said beginning point to a succession of points in the interior of said polytope, each succeeding point representing a more optimal allocation than the preceding point, and means for deploying the elements of said system to accommodate the preferred resource allocation specified by a point on said surface.

18. A technological resource allocation system for allocating technological resources among a plurality of resource users subject to constraints on said allocations and in such a manner as to reduce the total cost of said allocations, the allocations made in said system being determined in accordance with a method comprising the following steps:
(1) receiving information concerning availability of said technological resources, said users, said constraints, and said costs,
(2) representing said constraints as a polytope in multidimensional space,
(3) representing said allocation costs as a vector in said multidimensional space,
(4) selecting an initial allocation point located in the interior of said polytope,
(5) normalizing said polytope such that said initial allocation point is substantially at its center,
(6) determining the direction of said cost vector projected into the null space of said constraints within said normalized polytope,
(7) selecting a new allocation point in said normalized polytope in a direction opposite to the direction of said projected cost vector, and
(8) repeating steps (4) through (7) for said new allocation point,
(9) allocating said technological resources to said users in accordance with the latest one of said new allocation point.

19. A system comprising a plurality of resources achieving a plurality of end results and employing a recursive method for allocating said resources to achieve said end results, wherein a present resource allocation arrangement $x^i$ is replaced by an improved resource allocation arrangement $x^{i+1}$ which is derived from $x^i$ by the equation $x^{i+1} = \Phi\{X^i\}$ and which becomes the present resource allocation arrangement of the next iteration, the function $\Phi$ comprising:
(1) arranging the components of said present resource allocation arrangement along the diagonal of an otherwise empty matrix D;
(2) forming a matrix B by developing the matrix product AD and augmenting the developed product with a last row of n 1's;
(3) developing a vector $c_p$ by obtaining the value of $[I - B^T(BB^T)B]^{-1}Dc$ where I is the identity matrix;
(4) dividing $c_p$ by its magnitude to develop a normalized pointer $\hat{c}_p$;
(5) creating a transformed new estimate $x^{i+1}$ of x by subtracting $\alpha \hat{c}_p$ from said current transformed estimate $x^i$ of x, where $\alpha$ is less than unity;
(6) creating an untransformed new estimate of x by evaluating $Dx^{i+1}/e^TDx^{i+1}$ where $e = \{1, 1, \ldots, 1\}$; and
(7) applying said new estimate $x^{i+1}$ of x to said system.

20. The method of allocating industrial resources among a plurality of resource users, each said allocation having physical constraints on resource use and quantifiable costs or benefits associated with each said allocation, said method comprising the steps of
(1) receiving information concerning availability of said industrial resources, said users, said constraints, and said costs,
(2) representing said physical constraints with a system of linear relationships together defining a multidimensional polytope having a facet representing each of said physical constraints,
(3) selecting a tentative set of allocations of said resources represented by an interior point within said polytope as a beginning allocation point,
(4) transforming said polytope to place said beginning allocation point substantially at the geometrical center of said transformed polytope and all said facets at substantially equal distances from said center,
(5) moving from said beginning allocation point to another allocation point interior to said rescaled polytope but closer to the surface of said rescaled polytope,
(6) transforming said another allocation point back to the original scale of said polytope,
(7) repeating steps (4) through (6) until a point interior to said polytope is selected which is substantially coincident with said surface,
(8) identifying the allocation values associated with said point substantially coincident with said surface, and
(9) allocating said resources in accordance with the resource allocation values so identified.

21. A system for allocating industrial resources among a plurality of resource consumers, each resource allocation being physically constrained and having quantifiable costs associated with said allocation, said system providing allocations of said resources determined in accordance with a method comprising the steps of:
(1) representing said physical constraints as a system of linear relationships defining a closed convex multidimensional solid,
(2) selecting a resource allocation corresponding to a point interior to said multidimensional solid as a beginning point,
(3) transforming said closed solid so as to place said selected beginning point substantially at the geometric center of said transformed solid and the surfaces of said solid substantially equidistant from said center,
(4) selecting another allocation of said resources corresponding to another point interior to said rescaled closed solid but closer to said surface than said beginning point,
(5) repeating steps (3) and (4) with the new allocations until a selected allocation substantially corresponds to a point on the surface of said solid, and
arranging said system to allocate said resources in accordance with the final industrial resource allocation associated with said point on the surface of said solid.

22. A linear programming controller for use with a general purpose digital computer, said controller comprising:
a computer program storage medium having a computer program stored thereon for execution by said digital computer, said program comprising
means for processing a plurality of linear relationships defining a multidimensional convex polytope representing the set of feasible solutions to said plurality of linear relationships, and means, including a function to be optimized, for identifying that point on the boundary of said polytope representing the optimum solution to said plurality of linear relationships by proceeding in successive steps along a strictly feasible solution path entirely contained within the interior of said polytope.

23. A method for allocating physical resources among a plurality of resource users subject to constraints on said allocations and in such a manner as to reduce related allocation costs, said method comprising the steps of:

(1) representing said constraints as a polytope in multidimensional space,
(2) representing said allocation costs as a vector in said multidimensional space,
(3) selecting an initial allocation point located in the interior of said polytope,
(4) transforming said polytope into an equivalent space with said initial allocation point substantially at its center,
(5) determining the direction of said cost vector in said equivalent space,
(6) selecting a new allocation point in said equivalent space in a direction opposite to the direction of said cost vector,
(7) transforming said new allocation point back to the original space of said polytope,
(8) repeating steps (4) through (7) for said new allocation point,
(9) terminating the iterative process defined in steps (4) through (8) when evaluated allocation costs fall below a preselected threshold, and
(10) allocating said physical resources among said plurality of resource users in accordance with the latest one of said new allocation point.

24. A method for allocating industrial or technological resources $x_i$ ($i=1$, n) among a plurality of resource users subject to constraints $A_{ij}x_i \leq b_j$ and $x_i \geq 0$ ($i=1$, n; $j=1$, m) in such a manner as to optimize a cost function $c_i^T \cdot x_i$, said method comprising the steps of:

(1) selecting an initial allocation $x^{start} = (x_1^{start}, x_2^{start}, \ldots, x_n^{start})$ meeting said constraints,
(2) using the projective transformation $$x_i' = \frac{D^{-1}x}{e^T D^{-1}x}$$

where $D = \text{diag.}\{x_1^{start}, x_2^{start}, \ldots, x_n^{start}\}$, and $e = (1, 1, 1, \ldots, 1)$, to transform said constraints into an affine space with $x^{start}$ substantially at its center, (3) determining the cost function vector $c_p$ in said affine space by the relationship $c_p = \{I - B^T(BB^T)^{-1}B\}Dc$ where I is the identity matrix,
c is the cost vector,
D is defined above, and $B = (AD/e^T)$, (4) normalizing said cost function vector $c_p$ by the relationship $$\hat{c}_p = \frac{c_p}{|c_p|},$$

(5) selecting a new initial allocation b' in said affine space given by $b' = x'^{start} - \alpha r \hat{c}_p,$ where r is the radius of the largest inscribed sphere in said affine space and is given by $$r = \frac{1}{\sqrt{n(n-1)}},$$

and $\alpha$ is less than unity, (6) transforming said new new initial allocation point back to the original space with the transformation $$b = \frac{Db'}{e^T Db'},$$

and (7) repeating steps (2) through (6) using b instead of $a_o$ as the new initial allocation
(8) allocating said industrial or technological resources in accordance with said new allocation b'.

25. A method for improving overall cost in a system having a plurality n of industrial resources operating in concert to achieve a plurality of technological end results $b_j$, each of said resources providing a contribution to each of said end results with an attendant cost coefficient and subject to constraints characterizing said system, where vector b represents said plurality of end results, vector x represents the set of said contributions required of said plurality of resources, vector c represents the set of said cost coefficients, and matrix A represents said system constraints,

CHARACTERIZED BY:

selecting a set of contributions $x^{curr}$ satisfying said system constraints as a current estimate of x;
arranging said current estimate $x^{curr}$ along the diagonal of an otherwise empty matrix D;
forming a matrix B by developing the matrix product AD and augmenting the developed product with a last row of n 1's;
developing a pointer vector $c_p$ by evaluating $[I - B^T(BB^T)^{-1}B]Dc$ where I is the identity matrix;
dividing $c_p$ by its magnitude to develop a normalized pointer $\hat{c}_p$;
creating a transformed new estimate $x^1$ of x by subtracting $\alpha c_p$ from e/n, where $\alpha$ is less than unity,
creating an untransformed new estimate $x^{next}$ of x by evaluating Dx'/e Dx' where $e = \{1,1, \ldots 1\}$; and
applying said new estimate $x^{next}$ of x to said system.

26. Method for allocating industrial or technological resources, said method comprising:

the determination of values for controllable physical variables associated with said resources, the set of feasible combinations of said physical variables being a convex set and said determination to be effected so as to enhance the value of an objective function of said physical variables, said determination comprising a sequence of steps such that at each step tentative values for said physical variables are replaced said replacing based on choosing a direction in a set which is obtained by centralizing said convex set; and allocating said resources in accordance with the last step in said sequence of steps of replacing tentative values of said physical resources.

27. A method of optimizing the allocation of resources in a system characterized by a linear objective function, each element of which represents a specific resource allocation attributable to an individual entity of the system, and comprises a variable and a known variable coefficient, and by one or more constraint linear forms expressed in terms of one or more of the variables of the objective function, said method comprising the steps of (1) determining an initial value for each of the variables of the objective function such that a vector in n-dimensional space defined by the initial values resides inside a polytope defined by the constraint linear forms, (2) transforming the polytope including the initial vector and the constraint linear forms into a simplex $S\{x|x>=0, \Sigma x_i=1\}$ having the origin of the initial vector located substantially at its center, (3) projecting the transformed initial vector orthogonally onto the simplex, (4) determining the direction of the projection of the transformed initial vector in said simplex, (5) determining a new starting point for a new initial vector by moving from the center e/n of the simplex S in a direction opposite to said determined direction by a distance in said simplex equal to a multiple of the radius of the largest sphere inscribed in said simplex and centered at the origin of the transformed initial vector, (6) transforming said new starting point back into the polytope space, (7) repeating steps (2) through (6), substituting, for the initial values of the objective function variables, values defined by said transformed new starting point, until a satisfactory minimization of the objective function is obtained, and allocating system resources to the individual system entities according to the final values of the elements of the objective function.

28. The method of claim 27 wherein step (2) further comprises the step of:

generating a matrix B by multiplying a diagonal matrix of the initial values of the variables of the objective function by a matrix of the coefficients of the constraint linear forms, and adding an additional lower-most row to matrix B containing a value of unity in each matrix position of the row.

29. The method of claim 27 wherein step (3) further comprises the step of computing the orthogonal projection of the transformed initial vector from the matrix equation $[I - B^T(BB^T)^{-1}B]$ times the diagonal matrix of the initial variable values times the initial vector, where I is the identity matrix and $B^T$ is the transpose of the B matrix, and normalizing said orthogonal projection.

30. The method of claim 27 wherein step (5) further comprises the step of:

calculating a new transformed initial vector from the value of $(x^{start} - \alpha r)$ times said transformed cost vector, where $x^{start} = e/n$, r is the radius of said inscribed sphere and $\alpha$ is a preselected constant.

31. The invention of claim 30 further comprising the step of:

computing said radius from the formula $1/\sqrt{n(n-1)}$.

32. A method of optimizing an allocation of resources in a system characterized by an n-dimensional objective function, each element of which represents a specific resource allocation attributable to an individual entity of the system and comprises a variable and a known variable coefficient, and by one or more constraint relationships expressed in terms of one or more of the variables of the objective function, said method comprising the steps of:

(1) determining an initial value for each of the variables of the objective function such that an initial vector defined by the initial values resides inside a polytope defined by the constraint relationships, (2) transforming the polytope, including the initial vector and the constraint relationships, into a simplex $S = \{x | x_1 \geq 0, \Sigma x_i = 1\}$ in which the transformed initial vector is located substantially at the center of the simplex, (3) projecting the transformed vector of said objective function orthogonally onto the null space of the transformed constraint relationships, (4) determining the direction of the projection of the transformed objective function, (5) determining a new value for each of the variables of the objective function by moving from the center e/n of said simplex, a distance equal to a predefined multiple of the radius of the largest sphere contained within the simplex and centered at the origin of the transformed initial vector, (6) transforming said new values back into the original variables, (7) repeating steps (2) through (6), substituting said new values for the initial values of the objective function variables, until a satisfactory minimization of the objective function is obtained, and (8) allocating system resources to the individual system entities according to the final values of the elements of the objective function.

33. The method of claim 32 wherein step (2) further comprises the step of:

generating a matrix B by multiplying a diagonal matrix of the initial values of the variables of the objective function by a matrix of the coefficients of the constraint relationships, and adding an additional lowermost row to matrix B containing a value of unity in each matrix position of the row.

34. The method of claim 33 wherein step (3) further comprises the step of:

computing the orthogonal projection of the transformed initial vector from the matrix equation $[I - B^T(BB^T)^{-1}B]$ times the initial vector, where I is the identity matrix, and $B^T$ is the transpose of the B matrix, and normalizing said orthogonal projection in a predefined manner.

35. A linear programming system for optimally allocating physical resources in which feasible allocations are bounded by a closed, multidimensional, feasible allocation space, and in which optimum allocation involves at least one step from a less optimum allocation to a more optimum allocation, said system including first means responsive to said physical resources and to said allocation, second means for developing a resource allocation directive based on said first means, and third means for allocating said physical resources, characterized in that:

said allocation space is rescaled so as to initiate said step substantially at the center of the rescaled feasible allocation space.

36. A linear programming method for optimally allocating physical resources where feasible physical resource allocations are bounded by a closed, multidimensional, feasible physical resource allocation space, and where optimum allocation involves at least one step from a less optimum allocation to a more optimum allocation, characterized by the step of:

rescaling said physical resource allocation space so as to initiate said step substantially at the center of the rescaled space.

* * * * *